(12) United States Patent
Suk

(10) Patent No.: US 10,819,232 B2
(45) Date of Patent: Oct. 27, 2020

(54) DC-DC CONVERTER AND DRIVING METHOD THEREOF

(71) Applicant: ELECTRONICS AND TELECOMMUNICATIONS RESEARCH INSTITUTE, Daejeon (KR)

(72) Inventor: Jung Hee Suk, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 267 days.

(21) Appl. No.: 15/913,591

(22) Filed: Mar. 6, 2018

(65) Prior Publication Data

US 2018/0269788 A1 Sep. 20, 2018

(30) Foreign Application Priority Data

Mar. 14, 2017 (KR) .................. 10-2017-0031983
Sep. 4, 2017 (KR) .................. 10-2017-0112789

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/0009* (2013.01); *H02M 2001/0083* (2013.01)

(58) Field of Classification Search
CPC ............... H02M 3/158; H02M 1/08; H02M 2001/0083; H02M 2001/0009; H02M 2001/009
See application file for complete search history.

(56) References Cited

U.S. PATENT DOCUMENTS

| 8,937,472 B2 | 1/2015 | Heo et al. |
| 9,768,695 B2 | 9/2017 | Nomiyama et al. |
| 10,622,814 B2 * | 4/2020 | Tsai ..................... H02J 5/00 |
| 2004/0233690 A1 * | 11/2004 | Ledenev ............... H02M 3/285 363/133 |

(Continued)

FOREIGN PATENT DOCUMENTS

| KR | 10-1379375 B1 | 3/2014 |
| KR | 10-2016-0133599 A | 11/2016 |

*Primary Examiner* — Kyle J Moody
*Assistant Examiner* — Henry E Lee, III
(74) *Attorney, Agent, or Firm* — Rabin & Berdo, P.C.

(57) ABSTRACT

Provided is DC-DC converter including a first inductor configured to output a first inductor current based on an input voltage, a second inductor configured to output a second inductor current based on the input voltage, an output network unit configured to provide a first output voltage to a first output terminal and provide a second output voltage to a second output terminal based on the first inductor current or the second inductor current, a controller configured to determine cross-regulation with respect to the first output terminal and the second output terminal and generate a mode signal based on the determination, and an inductor network unit configured to connect the first inductor and the second inductor based on the mode signal or electrically isolate the first inductor and the second inductor.

18 Claims, 11 Drawing Sheets

(56) References Cited

U.S. PATENT DOCUMENTS

| | | | |
|---|---|---|---|
| 2007/0007935 A1* | 1/2007 | Johnson | H02M 1/15 323/282 |
| 2008/0231115 A1 | 9/2008 | Cho et al. | |
| 2015/0270779 A1 | 9/2015 | Im et al. | |
| 2017/0126146 A1* | 5/2017 | Petersen | H02M 3/156 |
| 2017/0237346 A1* | 8/2017 | Toyama | H02M 1/08 323/271 |

* cited by examiner

DC-DC CONVERTER AND DRIVING METHOD THEREOF

CROSS-REFERENCE TO RELATED APPLICATIONS

This U.S. non-provisional patent application claims priority under 35 U.S.C. § 119 of Korean Patent Application Nos. 10-2017-0031983, filed on Mar. 14, 2017, and 10-2017-0112789, filed on Sep. 4, 2017, the entire contents of which are hereby incorporated by reference.

BACKGROUND

The present disclosure herein relates to multiple output voltage control, and more particularly, to a DC-DC converter and a driving method thereof.

A direct current-to-direct current (DC-DC) converter steps up or steps down a DC input voltage to generate a DC output voltage required for the load. The load may include various electronic devices such as a computer or a mobile device. Such electronic devices may include elements for performing various functions. The various elements included in the electronic device may have different operating voltages. Therefore, there is a demand for a multiple output DC-DC converter capable of generating various output voltages in one DC-DC converter.

The multiple output DC-DC converter may include a plurality of voltage output terminals to generate various output voltages. The plurality of voltage output terminals may output DC output voltages of different voltage levels. The plurality of voltage output terminals are required to output the exact voltage level required by the load for any external factors. For example, a sudden change in load connected to a plurality of voltage output terminals may be one factor that hinders the accurate voltage output of the DC-DC converter. Therefore, there is a demand for securing the stability and accuracy of the output voltage of the DC-DC converter.

SUMMARY

The present disclosure provides a DC-DC converter and a driving method thereof for reducing the occurrence of cross-regulation at a plurality of output terminals.

An embodiment of the inventive concept provides a DC-DC converter including: a first inductor configured to output a first inductor current based on an input voltage; a second inductor configured to output a second inductor current based on the input voltage; an output network unit configured to provide a first output voltage to a first output terminal and provide a second output voltage to a second output terminal based on the first inductor current or the second inductor current; a controller configured to determine cross-regulation with respect to the first output terminal and the second output terminal and generate a mode signal based on the determination; and an inductor network unit configured to connect the first inductor and the second inductor based on the mode signal or electrically isolate the first inductor and the second inductor.

In an embodiment, the inductor network unit may include a serial mode switch that includes one terminal connected to the first inductor and the other terminal connected to the second inductor and is switched off when the first inductor current or the second inductor current after a reference time from a charging time point of the first inductor and the second inductor is greater than a threshold current.

In an embodiment, the inductor network unit may further include: a first isolation mode switch including one terminal connected to the first inductor and the other terminal connected to the output network unit; and a second isolation mode switch including one terminal receiving the input voltage and the other terminal connected to the second inductor, wherein the first isolation mode switch and the second isolation mode switch may be switched on when the first inductor current or the second inductor current after the reference time from the charging time point is greater than the threshold current.

In an embodiment, the output network unit may include: a first normal output switch including one terminal connected to the second inductor and the other terminal connected to the first output terminal; a first split output switch including one terminal connected to the first isolation mode switch and the other terminal connected to the first output terminal; a second normal output switch including one terminal connected to the second inductor and the other terminal connected to the second output terminal; and a second split output switch including one terminal connected to the first isolation mode switch and the other terminal coupled to the second output terminal.

In an embodiment, the controller may include: a mode control unit configured to sense the first inductor current and the second inductor current to generate the mode signal and a clock modulation signal; and a switch control unit configured to control the output network unit and the inductor network unit based on the mode signal and the clock modulation signal.

In an embodiment, the mode control unit may include: a cross-regulation detector configured to output a cross-regulation signal when the first inductor current or the second inductor current after a reference time from a charging time point is greater than a threshold current; a clock modulator configured to increase a pulse width of the clock modulation signal based on the cross-regulation signal; and a mode converter configured to generate a mode signal based on the cross-regulation signal.

In an embodiment, the mode signal may include an isolation mode signal, wherein the mode converter may generate an isolation mode signal when receiving the cross-regulation signal, wherein the switch control unit may electrically isolate the first inductor and the second inductor based on the isolation mode signal.

In an embodiment, the mode control unit may include: a first current counter configured to generate a first discharging time signal by measuring a first full discharging time at which the first inductor current is below the threshold current; and a second current counter configured to generate a second discharging time signal by measuring a second full discharging time at which the second inductor current is below the threshold current.

In an embodiment, the mode signal may include a serial mode signal, wherein the mode converter may receive the first discharging time signal and the second discharging time signal, and generate a serial mode signal when the first full discharging time is greater than a first stabilization time and the second full discharging time is greater than a second stabilization time, wherein the switch control unit may electrically connect the first inductor and the second inductor based on the serial mode signal.

In an embodiment, the controller may further include an output control unit configured to compare the first output voltage with a first reference voltage to provide a first output control signal to the switch control unit and compare the second output voltage with a second reference voltage to provide a second output control signal to the switch control unit.

In an embodiment of the inventive concept, a DC-DC converter driving method includes: connecting, by an inductor network unit, a first inductor and a second inductor in series based on a serial mode signal; providing, by an output network unit, a first output voltage to a first output terminal and a second output voltage to a second output terminal based on an inductor current flowing through the first inductor and the second inductor; generating, by a controller, an isolation mode signal when the inductor current after a reference time from the charging time point of the first inductor and the second inductor is greater than a threshold current; electrically isolating, by the inductor network unit, the first inductor and the second inductor based on the isolation mode signal; and providing, by the output network unit, a third output voltage to the first output terminal based on a first inductor current flowing in the first inductor and a fourth output voltage to the second output terminal based on a second inductor current flowing in the second inductor.

In an embodiment, the providing of the first and second output voltages may include: providing the first output voltage for a first reference time; and providing the second output voltage for a second reference time after the first output time.

In an embodiment, the generating of the isolation mode signal may include extending the reference time until the inductor current has the same value as the threshold current.

In an embodiment, the generating of the isolation mode signal may include: sensing the inductor current by the controller; generating a high-level cross-regulation signal when the inductor current is greater than the threshold current; and converting the serial mode signal into the isolation mode signal based on the cross-regulation signal.

In an embodiment, the providing of the third and fourth output voltages may include simultaneously charging the first inductor and the second inductor based on the isolation mode signal.

In an embodiment, a voltage level of the first output voltage and a voltage level of the third output voltage may be the same, and a voltage level of the second output voltage and a voltage level of the fourth output voltage may be the same.

In an embodiment, the method may further include: measuring, by the controller, a first full discharging time at which the first inductor current is below the threshold current and a second full discharging time at which the second inductor current is below the threshold current; generating, by the controller, the serial mode signal when the first full discharging time is greater than a first stabilization time and the second full discharging time is greater than a second stabilization time; and connecting, by the inductor network unit, the isolated first and second inductors in series based on the serial mode signal.

In an embodiment, a magnitude of the threshold current may be zero and the first stabilization time and the second stabilization time may be dependent on the reference time and an inductance of the first and second inductors.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

Figure 1:
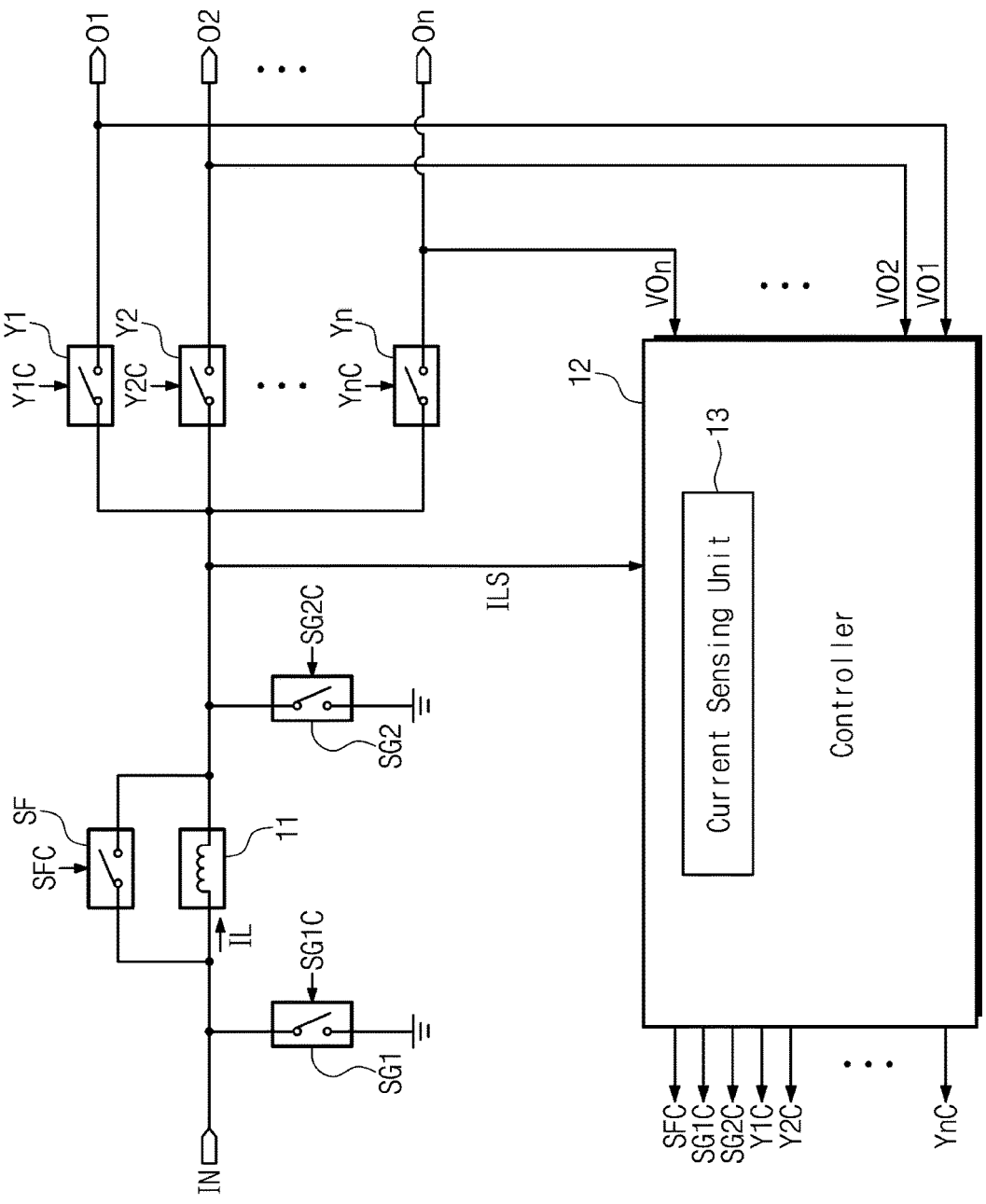
FIG. 1 is a circuit diagram of a DC-DC converter.

FIG. 1 is a circuit diagram of a DC-DC converter. Referring to FIG. 1, the DC-DC converter 10 includes an inductor 11, a controller 12, a first grounding switch SG1, a second grounding switch SG2, an inductor switch SF, and a plurality of output switches Y1 to Yn. The DC-DC converter 10 may include an input terminal IN for receiving a DC input voltage from a power supply unit (not shown). The DC-DC converter 10 may generate or output a plurality of output voltages VO1 to VOn having various voltage levels by stepping up or down the DC input voltage.

The inductor 11 is electrically connected to the input terminal IN. A voltage difference is generated across the inductor 11 based on the input voltage generated in the power supply unit (not shown), and the inductor current IL flows. As the inductor current IL increases, the inductor 11 may store energy. The stored energy may be delivered to the load based on the on-off operation of the first and second ground switches SG1 and SG2 and the plurality of output switches Y1 to Yn. For energy output, the inductor 11 is electrically connected to the plurality of output switches Y1 to Yn.

The inductor switch SF is connected in parallel with the inductor 11. The inductor switch SF may be switched on or switched off in response to the inductor switch control signal SFC. When the inductor switch SF is switched on, the potential difference across the inductor 11 may be equalized. In this case, the inductor current IL may be constant with time. That is, the inductor switch SF may be controlled to keep the energy stored in the inductor 11 constant.

The first and second grounding switches SG1 and SG2 are connected between the ground and the inductor 11. The first ground switch SG1 may be switched on or switched off in response to the first ground switch control signal SG1C. The second ground switch SG2 may be switched on or switched off in response to the second ground switch control signal SG2C. When the first grounding switch SG1 is switched on, the input voltage is not applied to the inductor 11. That is, the first ground switch SG1 may be controlled to block the supply of energy to the inductor 11. When the second ground switch SG2 is switched on, the inductor current IL is not transmitted to the plurality of output switches Y1 to Yn. That is, the second ground switch SG2 may be controlled to block the output of energy.

The plurality of output switches Y1 to Yn are electrically connected to the inductor 11. The plurality of output switches Y1 to Yn receive the inductor current IL from the inductor 11. The plurality of output switches Y1 to Yn are electrically connected to a plurality of output terminals O1 to On. The plurality of output switches Y1 to Yn are electrically connected to a plurality of output terminals O1 to On.

The controller 12 may generate control signals for controlling the plurality of output switches Y1 to Yn, the first grounding switch SG1, the second grounding switch SG2, and the inductor switch SF. The controller 12 may be electrically connected to the plurality of output terminals O1 to On to receive the plurality of output voltages VO1 to VOn. The controller 12 may be electrically connected to the inductor 11 and may receive the sensing current ILS from the inductor 11. The controller 13 may include a current sensing unit 13 for sensing the sensing current ILS. The controller 12 may control the plurality of output switches Y1 to Yn, the first ground switch SG1, the second ground switch SG2, and the inductor switch SF based on the plurality of output voltages VO1 to VOn and the sensing current ILS.

The plurality of output terminals O1 to On may output voltages of different levels. The plurality of output terminals O1 to On may output voltages of different levels based on the on-off operation of the plurality of output switches Y1 to Yn, the first ground switch SG1, and the second ground switch SG2. For example, the energy level stored in the inductor 11 may be adjusted based on the time when the second ground switch SG2 is switched on and the time when the first ground switch SG1 is switched off.

The plurality of output terminals O1 to On may output a voltage to an electronic device (load) requiring supply of various levels of voltage. If the load corresponding to a particular output terminal changes abruptly, the voltage provided to the other output terminal may change. That is, cross-regulation may occur. For example, when the load connected to the first output terminal O1 sharply is increased, the required energy may increase. At this time, the charging time and the discharging time for providing energy to the first output terminal O1 may increase. In this case, the inductor 11 may not be fully discharged for a certain time. The inductor 11 may charge the energy to be supplied to the second output terminal O2 while the remaining energy is stored. As a result, the voltage required for the second output terminal O2 may not be provided.

Hereinafter, the DC-DC converter and the driving method thereof according to the embodiment of the inventive concept may operate in a serial mode or an isolation mode. A multiple output DC-DC converter may cause cross-regulation based on abrupt changes in load connected to specific output terminals. The serial mode may be an operation mode in a normal state where no cross-regulation occurs. In the serial mode, a DC-DC converter to be described later electrically connects the first inductor and the second inductor. The isolation mode may be an operation mode in a state where the possibility of cross-regulation appears. In the isolation mode, the DC-DC converter described below electrically isolates the first inductor and the second inductor.

Figure 2:
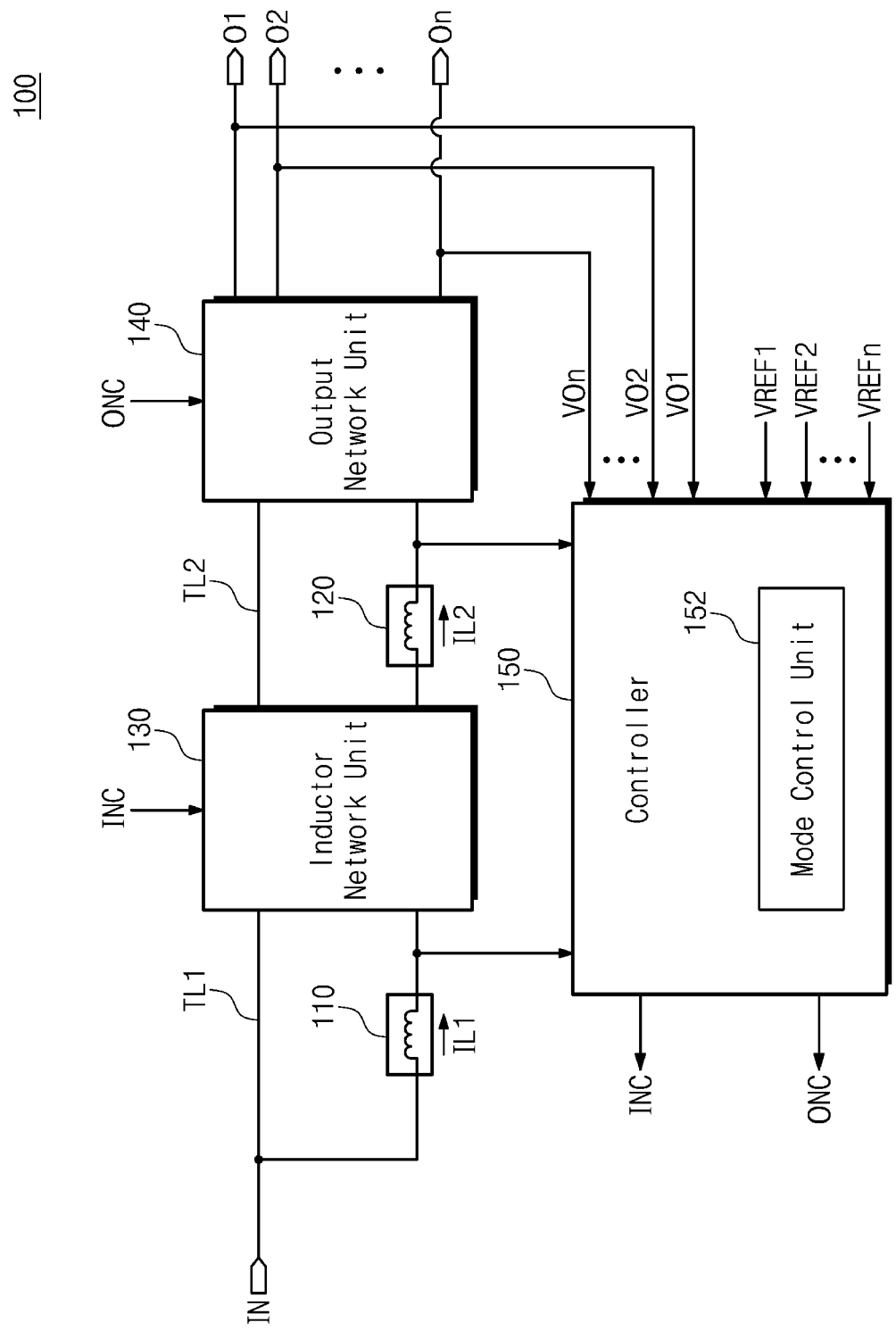
FIG. 2 is a block diagram of a DC-DC converter according to an embodiment of the inventive concept.

FIG. 2 is a block diagram of a DC-DC converter according to an embodiment of the inventive concept. Referring to FIG. 2, the DC-DC converter 100 includes a first inductor 110, a second inductor 120, an inductor network unit 130, an output network unit 140, a controller 150, a transmission line TL1, and a second isolation transmission line TL2. The DC-DC converter 100 receives a DC input voltage from a power supply unit (not shown). The DC-DC converter 100 may include an input terminal IN for receiving an input voltage. The DC-DC converter 100 may be a boost converter that steps up the input voltage, or a buck converter that steps down the input voltage.

The first inductor 110 may include a terminal connected to the input terminal IN and another terminal connected to the inductor network unit 130. The first inductor 110 may provide a first inductor current IL1 to the inductor network unit 130 based on an input voltage generated in a power supply unit (not shown). The first isolation transmission line TL1 electrically connects the input terminal IN and the inductor network unit 130. Depending on the path setting of the inductor network unit 130, the first inductor current IL1 may be provided to the inductor network unit 130 through the first inductor 110. Alternatively, current may be provided to the inductor network unit 130 through the first isolation transmission line TL1.

The second inductor 120 may include one terminal connected to the inductor network unit 130 and another terminal connected to the output network unit 140. The second inductor 120 may provide the second inductor current IL2 to the inductor network unit 130. The first inductor 110 and the second inductor 120 may be electrically connected to each other according to the path setting of the inductor network unit 130. In this case, the first inductor current IL1 and the second inductor current IL2 may be the same. The first inductor 110 and the second inductor 120 may be electrically disconnected according to the path setting of the inductor network unit 130. In this case, the first inductor current IL1 and the second inductor current IL2 may be different.

The second isolation transmission line TL2 electrically connects the inductor network unit 130 and the output network unit 140. The current provided from the first isolation transmission line TL1 or the first inductor 110 may be provided to the second inductor 120 according to the path setting of the inductor network unit 130. Alternatively, the first inductor current IL1 provided from the first inductor 110 may be provided to the second isolation transmission line TL2.

The inductor network unit 130 is connected to the first inductor 110, the second inductor 120, the first isolation transmission line TL1, and the second isolation transmission line TL2. The inductor network unit 130 constitutes a network between the first inductor 110, the second inductor 120, the first isolation transmission line TL1, and the second isolation transmission line TL2. The inductor network unit 130 may include switches for network configuration. The inductor network unit 130 receives the inductor network control signal INC generated from the controller 150 to configure the network. The inductor network control signal INC may include a plurality of control signals for controlling the switches included in the inductor network unit 130.

The inductor network unit 130 may reconfigure the network according to the operating mode of the DC-DC converter 100. In general, the inductor network unit 130 operates in a serial mode. The inductor network unit 130 electrically connects the first inductor 110 and the second inductor 120. The inductor network unit 130 configures the network so that current may not flow through the first isolation transmission line TL1 and the second isolation transmission line TL2. That is, the inductor network unit 130 may configure the network such that the inductor current is provided to the output network unit 140 through the first inductor 110 and the second inductor 120.

When the occurrence of the cross-regulation is expected due to the abrupt change of the load connected to the output terminal, the operation mode of the DC-DC converter 100 is changed to the isolation mode. The inductor network unit 130 may reconfigure the network so that one inductor provides energy to an output terminal for generating cross-regulation. For example, the inductor network unit 130 electrically connects the first isolation transmission line TL1 and the second inductor 120, and electrically connects the second isolation transmission line TL2 and the first inductor 110. The first inductor 110 and the second inductor 120 are electrically isolated.

The first inductor 110 may provide energy to the load that generates the cross-regulation. At this time, the second inductor 120 may provide energy to other loads. Conversely, the second inductor 120 may provide energy to the load causing the cross-regulation, and the first inductor 110 may provide energy to other loads. Output terminals connected to a load that is expected to experience cross-regulation may transfer energy using other inductors than other output terminals. Therefore, other loads may not be affected by abnormal operation.

The output network unit 140 is connected to the second inductor 120 and the second isolation transmission line TL2. The output network unit 140 receives current from the second inductor 120 or the second isolation transmission line TL2. In the serial mode, the output network unit 140 receives the second inductor current IL2 from the second inductor 120. In this case, the second inductor current IL2 and the first inductor current IL1 may be the same. In the isolation mode, the output network unit 140 receives the first inductor current IL1 from the second isolation transmission line TL2. The output network unit 140 receives the second inductor current IL2 from the second inductor 120.

The output network unit 140 is connected to the first to nth output terminals O1 to On. The output network unit 140 provides the current received from the second inductor 120 or the second isolation transmission line TL2 to the first to nth output terminals O1 to On. The first to nth output terminals O1 to On provide the output voltage to the load based on the current received from the output network unit 140. The first to nth output terminals O1 to On may have the same configuration as the plurality of output terminals O1 to On in FIG. 1. The output network unit 140 may selectively provide the received currents to the first to nth output terminals O1 to On. For example, the output network unit 140 may alternatively transmit energy to the first through nth output terminals O1 to On. For this, the output network unit 140 may include a plurality of switches.

The output network unit 140 may configure the network according to the operation mode of the DC-DC converter 100. The output network unit 140 may receive the output network control signal ONC generated from the controller 150 to configure the network. The output network control signal ONC may include a plurality of control signals for controlling the switches included in the output network unit 140.

In the serial mode, the output network unit 140 electrically connects the second inductor 120 and the first to nth output terminals O1 to On to transmit energy. At this time, the output network unit 140 blocks the electrical connection between the second isolation transmission line TL2 and the first to nth output terminals O1 to On. In the isolation mode, the output network unit 140 electrically connects an output terminal for transmitting energy among the first to nth output terminals O1 to On to the second isolation transmission line TL2 or the second inductor 120. At this time, the second isolation transmission line TL2 is electrically connected to the first inductor 110. The voltage level of each of the output voltages provided to the first to nth output terminals O1 to On in the serial mode may be the same as the voltage levels of the output voltages provided to the first to nth output terminals O1 to On in the isolation mode.

The controller 150 generates an inductor network control signal INC and an output network control signal ONC. The controller 150 controls the inductor network unit 130 and the output network unit 140 such that a stable output voltage is provided to the first to nth output terminals O1 to On. The controller 150 may be electrically connected to the first to nth output terminals O1 to On to receive the first to nth output voltages VO1 to VOn. The controller 150 compares the first to the nth reference voltages VREF1 to VREFn with the first to nth output voltages VO1 to VOn, respectively. The first to nth reference voltages VREF1 to VREFn may be the target voltages of the first to nth output terminals O1 to On, respectively.

The controller 150 controls the inductor network unit 130 and the output network unit 140 to compensate for the difference between the first to nth output voltages VO1 to VOn and the first to nth output terminals O1 to On, Can be controlled. Specifically, the controller 150 may sense the first inductor current IL1 flowing through the first inductor 110 and the second inductor current IL2 flowing through the second inductor 120. The controller 150 may control the inductor network unit 130 and the output network unit 140 to adjust the magnitude of the first inductor current IL1 and the second inductor current IL2. The levels of the first to nth output voltages VO1 to VOn may be adjusted based on the adjusted first inductor current IL1 and the second inductor current IL2.

The controller 150 includes a mode control unit 152. The mode control unit 152 may determine the operation mode of the DC-DC converter 100. The mode control unit 152 may determine the operation mode as a serial mode or an isolation mode based on the first inductor current IL1 and the second inductor current IL2. The mode control unit 152 may measure the discharging time of the first inductor 110 and the second inductor 120 based on the magnitudes of the first inductor current IL1 and the second inductor current IL2. If the first inductor 110 or the second inductor 120 is not completely discharged during the reference time, the mode control unit 152 may determine that the occurrence of cross-regulation is expected. In this case, the mode control unit 152 may change the operation mode to the isolation mode.

If the mode control unit 152 determines that there is no possibility of cross-regulation after changing to the isolation mode, the operation mode may be changed to the serial mode again. For example, the mode control unit 152 may determine the occurrence of cross-regulation by measuring a time when no current flows through the first inductor 110 and the second inductor 120. The details of the determination of the possibility of occurrence of cross-regulation will be described later. The mode control unit 152 may generate a mode signal for determining the operation mode. The mode signal includes a serial mode signal and an isolation mode signal. The controller 150 generates an inductor network control signal INC and an output network control signal ONC based on the mode signal.

Figure 3:
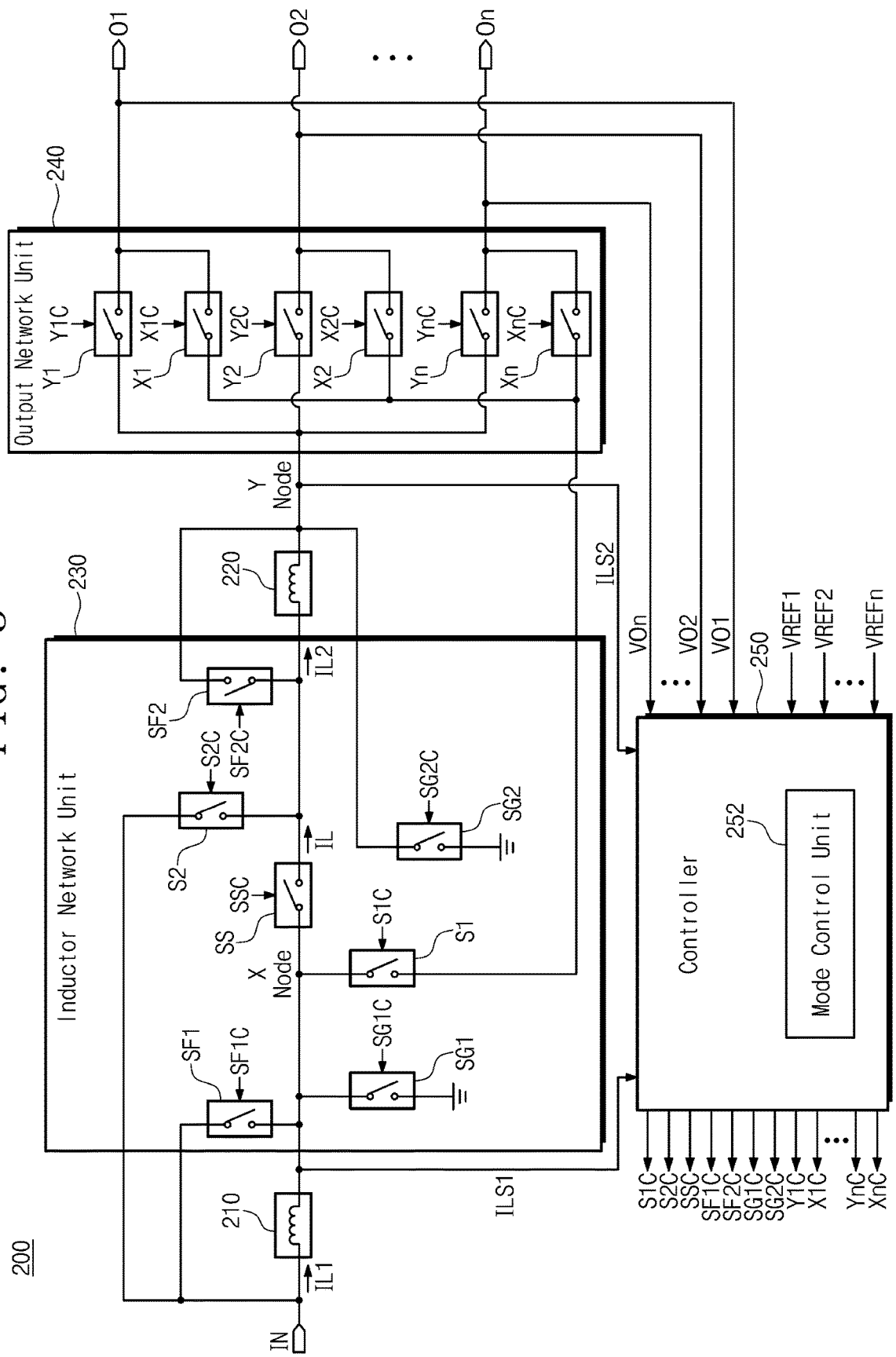
FIG. 3 is a circuit diagram of a DC-DC converter according to an embodiment of the inventive concept.

FIG. 3 is a circuit diagram of a DC-DC converter according to an embodiment of the inventive concept. FIG. 3 may be understood as a specific circuit diagram of the block diagram of FIG. 2. Referring to FIG. 3, the DC-DC converter 200 includes a first inductor 210, a second inductor 220, an inductor network unit 230, an output network unit 240, and a controller 250. The controller 250 includes a mode control unit 252. The first inductor 210 and the second inductor 220 may be the same as those in FIG. 2.

The inductor network unit 230 includes a serial mode switch SS, a first isolation mode switch S1, a second isolation mode switch S2, a first inductor switch SF1, a second inductor switch SF2, a first ground switch SG1, and a second ground switch SG2. The first inductor switch SF1 is connected in parallel with the first inductor 210. The first inductor switch SF1 may be switched on in response to the first inductor switch control signal SF1C. As a result, the energy stored in the first inductor 210 may be kept constant. The second inductor switch SF2 is connected in parallel with the second inductor 220. The second inductor switch SF2 may be switched on in response to the second inductor switch control signal SF2C. As a result, the energy stored in the second inductor 220 may be kept constant.

The first ground switch SG1 is used to charge the first inductor 210 in isolation mode. The first ground switch SG1 may be switched on in response to the first ground switch control signal SG1C. As a result, the first inductor 210 may be charged with energy. The second ground switch SG2 is used to charge the first inductor 210 and the second inductor 220 in the serial mode. The second ground switch SG2 is used to charge the second inductor 220 in the isolation mode. The second ground switch SG2 may be switched on in response to the second ground switch control signal SG2C. As a result, energy may be charged in the second inductor 220 in the isolation mode, and energy may be charged in the first inductor 210 and the second inductor 220 in the serial mode.

The serial mode switch SS includes one terminal connected to the first inductor 210 and the other terminal connected to the second inductor 220. The serial mode switch SS may further include a control terminal for receiving the serial mode switch control signal SSC. The serial mode switch SS may be switched on or switched off in response to the serial mode switch control signal SSC. The serial mode switch SS may be switched on in the serial mode and switched off in the isolation mode. The serial mode switch SS electrically connects the first inductor 210 and the second inductor 220 in the serial mode. The serial mode switch SS electrically isolates the first inductor 210 and the second inductor 220 in the isolation mode.

The first isolation mode switch S1 includes one terminal connected to the first inductor 210 and the other terminal connected to the output network unit 240. The first isolation mode switch S1 may further include a control terminal for receiving the first isolation mode control signal S1C. The first isolation mode switch S1 may be switched on or switched off in response to the first isolation mode control signal S1C. The first isolation mode switch S1 may be switched off in the serial mode and switched on in the isolation mode. In the isolation mode, the first isolation mode switch S1 electrically connects the first inductor 210 and the output network unit 240.

The second isolation mode switch S2 includes one terminal connected to the second inductor 220 and the other terminal connected to the input terminal IN. The second isolation mode switch S2 may further include a control terminal for receiving the second isolation mode control signal S2C. The second isolation mode switch S2 may be switched on or switched off in response to the second isolation mode control signal S2C. The second isolation mode switch S2 may be switched off in the serial mode and switched on in the isolation mode. In the isolation mode, the second isolation mode switch S2 electrically connects the second inductor 220 and the input terminal IN.

In the serial mode, the first inductor 210 and the second inductor 220 are connected in series. Therefore, the same inductor current IL may flow through the first inductor 210 and the second inductor 220. In the serial mode, the first inductor current IL1 and the second inductor current IL2 may be the same. The inductor current IL depends on the sum of the inductances of the first inductor 210 and the second inductor 220. The sum of the inductances of the first inductor 210 and the second inductor 220 is greater than the inductance of the first inductor 210 or the inductance of the second inductor 220. As the inductance increases, the ripple current at the output terminal decreases. Accordingly, the DC-DC converter 200 may reduce the ripple current of the output terminal in the serial mode.

In the isolation mode, the first inductor 210 and the second inductor 220 are separated. Therefore, the transmission path of the first inductor current IL1 and the transmission path of the second inductor current IL2 are different from each other. The first inductor current IL1 (or the second inductor current IL2) may be provided at the output terminal where the cross-regulation is expected. The second inductor current IL2 (or the first inductor current IL1) may be provided to the remaining output terminals. In the isolation mode, the current provided to the output terminal is generated based on one inductor. As the inductance decreases, the charge and discharge rates of the inductor increase. Therefore, the DC-DC converter 200 may supply the output voltage at a high speed to the load where a sudden change occurs.

The output network unit 240 may include first to nth normal output switches Y1 to Yn and first to nth split output switches X1 to Xn. The first to nth normal output switches Y1 to Yn all include one terminal connected to the second inductor 220. One terminals of each of the first to nth normal output switches Y1 to Yn are electrically connected to each other. The first to nth normal output switches Y1 to Yn include other terminals connected to one output terminal of the first to nth output terminals O1 to On. For example, the other terminal of the first normal output switch Y1 is connected to the first output terminal O1, and the other terminal of the second normal output switch Y2 is connected to the second output terminal O2.

The first to nth normal output switches Y1 to Yn may be switched on or switched off in response to the first to nth normal output switch control signals Y1C to YnC. The first to nth normal output switches Y1 to Yn are switched on during a time to provide an output voltage to the corresponding output terminal. For example, when the DC-DC converter 200 sequentially provides output voltages to the first to nth output terminals O1 to On, the first to nth normal output switches Y1 to Yn switch on sequentially. In the serial mode, the first to nth normal output switches Y1 to Yn receive the inductor current IL. In the isolation mode, the first to nth normal output switches Y1 to Yn receive the second inductor current IL2.

The first to nth split output switches X1 to Xn all include one terminal connected to the other terminal of the first isolation mode switch S1. One terminals of each of the first to nth split output switches X1 to Xn are electrically connected to each other. The first to nth split output switches X1 to Xn include the other terminal connected to one output terminal of the first to nth output terminals O1 to On. For example, the other terminal of the first split output switch X1 is connected to the first output terminal O1 and the other terminal of the second split output switch X2 is connected to the second output terminal O2.

The first to nth split output switches X1 to Xn may be switched on or switched off in response to the first to nth split output switch control signals X1C to XnC. The first to nth split output switches X1 to Xn are switched on for a time to provide an output voltage to the corresponding output terminal. For example, when the DC-DC converter 200 sequentially provides output voltages to the first to nth output terminals O1 to On, the first to nth split output switches X1 to Xn switch on sequentially. In the serial mode, since the first isolation mode switch S1 is switched off, the first to nth split output switches X1 to Xn do not receive current. In the isolation mode, first through nth split output switches X1 to Xn receive a first inductor current IL1.

The path through which the first through nth normal output switches Y1 through Yn receive the current is different from the path through which the first through nth split output switches X1 through Xn receive the current. In the serial mode, the first to nth normal output switches Y1 to Yn may receive the inductor current IL to provide the output voltage to the first to nth output terminals O1 to On. In the isolation mode, the first to nth normal output switches Y1 to Yn may provide the second inductor current IL2 to the normal loads. In the isolation mode, the first to nth split output switches X1 to Xn may provide the first inductor current IL1 to a load that causes cross-regulation.

Unlike this, the output network unit 240 may configure the network in a variety of ways to the extent that no cross-regulation occurs. For example, the output network unit 240 may provide the second inductor current IL2 to a load that causes cross-regulation. Alternatively, the output network unit 240 may provide the first inductor current IL1 to a load where cross-regulation is expected and some loads where a time to be fully discharged is secured.

The output network unit 240 may configure an optimized output network considering the necessity and stability of a rapid voltage supply. For example, the inductance of the first inductor 210 and the inductance of the second inductor 220 may be different. In this case, the first inductor 210 and the second inductor 220 may have different charging/discharging speeds and may generate different ripple currents. To the extent that cross-regulation does not occur, the output network unit 240 may provide energy stored in an inductor having a higher inductance to a load requiring fast voltage supply.

The controller 250 controls the inductor network unit 230 and the output network unit 240. The controller 250 senses the first inductor current IL1 and the second inductor current IL2. That is, the controller 250 receives the first sensing current ILS1 depending on the magnitude of the first inductor current IL1 and the second sensing current ILS2 depending on the magnitude of the second inductor current IL2. The controller 250 may generate signals S1C, S2C, SSC, SF1C, SF2C, SG1C, and SG2C for switching on or off the switches included in the inductor network unit 230. The controller 250 may generate signals Y1C to YnC, X1C to XnC for switching on or switching off the switches included in the output network unit 240.

Figure 4:
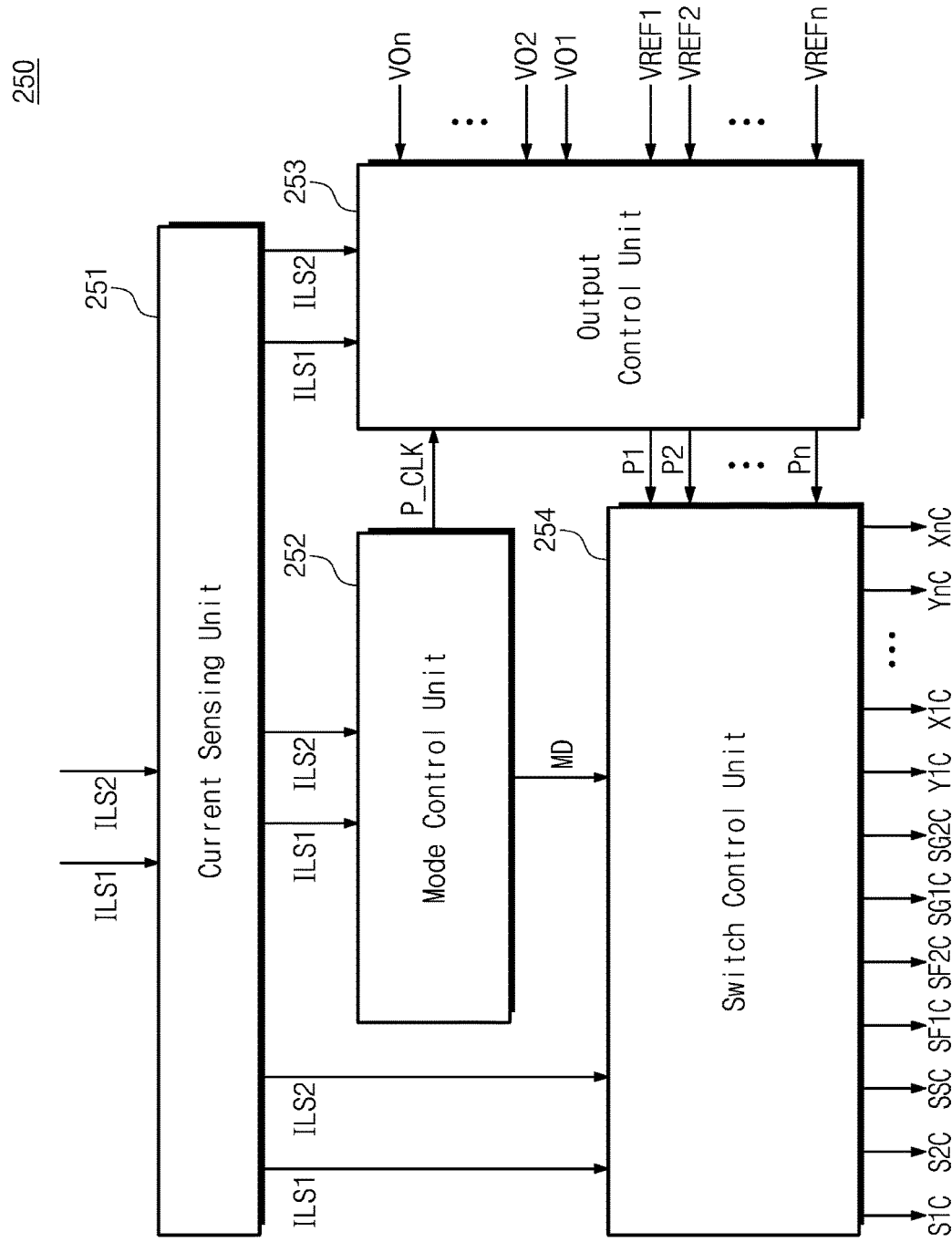
FIG. 4 is a block diagram of a controller according to an embodiment of the inventive concept.

FIG. 4 is a block diagram of a controller according to an embodiment of the inventive concept. FIG. 4 will be understood as an embodiment of the controller 250 of FIG. 3. Referring to FIG. 4, the controller 250 includes a current sensing unit 251, a mode control unit 252, an output control unit 253, and a switch control unit 254. The current sensing unit 251 receives the first sensing current ILS1 and the second sensing current ILS2. The current sensing unit 251 may be electrically connected to the first inductor 210 and the second inductor 220 of FIG. 3. In the serial mode, the first sensing current ILS1 and the second sensing current ILS2 may have the same magnitude. The magnitude of the first sensing current ILS1 may be proportional to the magnitude of the first current IL1. The magnitude of the second sensing current ILS2 may be proportional to the magnitude of the second current IL2.

The current sensing unit 251 may output the first sensing current ILS1 and the second sensing current ILS2 to the mode control unit 252, the output control unit 253, and the switch control unit 254. However, the inventive concept is not limited thereto. The current sensing unit 251 may output first inductor current data including magnitude information of the first inductor current IL1 and second inductor current data including magnitude information of the second inductor current IL2. In this case, the current sensing unit 251 may include an analog-to-digital converter for converting an analog signal into a digital signal. Hereinafter, it is assumed that the current sensing unit 251 outputs the first sensing current ILS1 and the second sensing current ILS2.

The mode control unit 252 receives the first sensing current ILS1 and the second sensing current ILS2 from the current sensing unit 251. The mode control unit 252 generates the mode signal MD based on the magnitudes of the first sensing current ILS1 and the second sensing current ILS2. The mode control unit 252 provides the mode signal MD to the switch control unit 254. The mode signal MD includes a serial mode signal generated when operating in a serial mode and an isolation mode signal generated when operating in an isolation mode. The mode control unit 252 may generate a serial mode signal or an isolation mode signal based on the possibility of cross-regulation.

The mode control unit 252 generates the clock modulation signal P_CLK based on the magnitudes of the first sensing current ILS1 and the second sensing current ILS2. The mode control unit 252 provides the clock modulation signal P_CLK to the output control unit 253. When the first inductor 210 or the second inductor 220 is not completely discharged, the magnitude of the first inductor current IL1 or the second inductor current IL2 may be larger than the threshold current. The threshold current may be zero. The mode control unit 252 may generate a clock modulation signal P_CLK by maintaining the pulse until the threshold current is reached.

The output control unit 253 receives the first to nth output voltages VO1 to VOn. The output control unit 253 may be electrically connected to the first to nth output terminals O1 to On in FIG. 3. The output control unit 253 compares the first to nth output voltages VO1 to VOn with the first to nth reference voltages VREF1 to VREFn, respectively. The output control unit 253 may amplify the difference between the first to nth output voltages VO1 to VOn and the first to nth reference voltages VREF1 to VREFn, respectively. Based on the amplified difference values, the output control unit 253 generates the first to nth output control signals P1 to Pn. The DC-DC converter 200 may adjust the first to nth output voltages VO1 to VOn based on the first to nth output control signals P1 to Pn.

The output control unit 253 receives the first sensing current ILS1 and the second sensing current ILS2 from the current sensing unit 251. The output control unit 253 may generate the first to nth output control signals P1 to Pn based on the sensed first sensing current ILS1 and the second sensing current ILS2. When the levels of the first inductor current IL1 or the second inductor current IL2 are changed, the first to nth output voltages VO1 to VOn may be adjusted. The output control unit 253 may generate the first to nth output control signals P1 to Pn for controlling the first inductor current IL1 or the second inductor current IL2. The output control unit 253 receives the clock modulation signal P_CLK from the mode control unit 252. The output control unit 253 may use the clock modulation signal P_CLK as a reference clock.

The switch control unit 254 receives the first sensing current ILS1 and the second sensing current ILS2 from the current sensing unit 251. The switch control unit 254 receives the mode signal MD from the mode control unit 252. The switch control unit 254 receives the first to nth output control signals P1 to Pn from the output control unit 253. The switch control unit 254 may generate signals for controlling the switches included in the inductor network unit 230 and the output network unit 240 based on the first sensing current ILS1, the second sensing current ILS2, the mode signal MD, and the first through nth output control signals P1 to Pn.

The switch control unit 254 may generate switch control signals for configuring the network corresponding to the serial mode or the isolation mode. The switch control unit 254 may generate switch control signals based on the mode signal MD. The switch control unit 254 may generate the switch control signals such that the first to nth output voltages VO1 to VOn correspond to the first to nth reference voltages VREF1 to VREFn. The switch control unit 254 may generate switch control signals that control the first inductor current IL1 or the second inductor current IL2.

Figure 5:
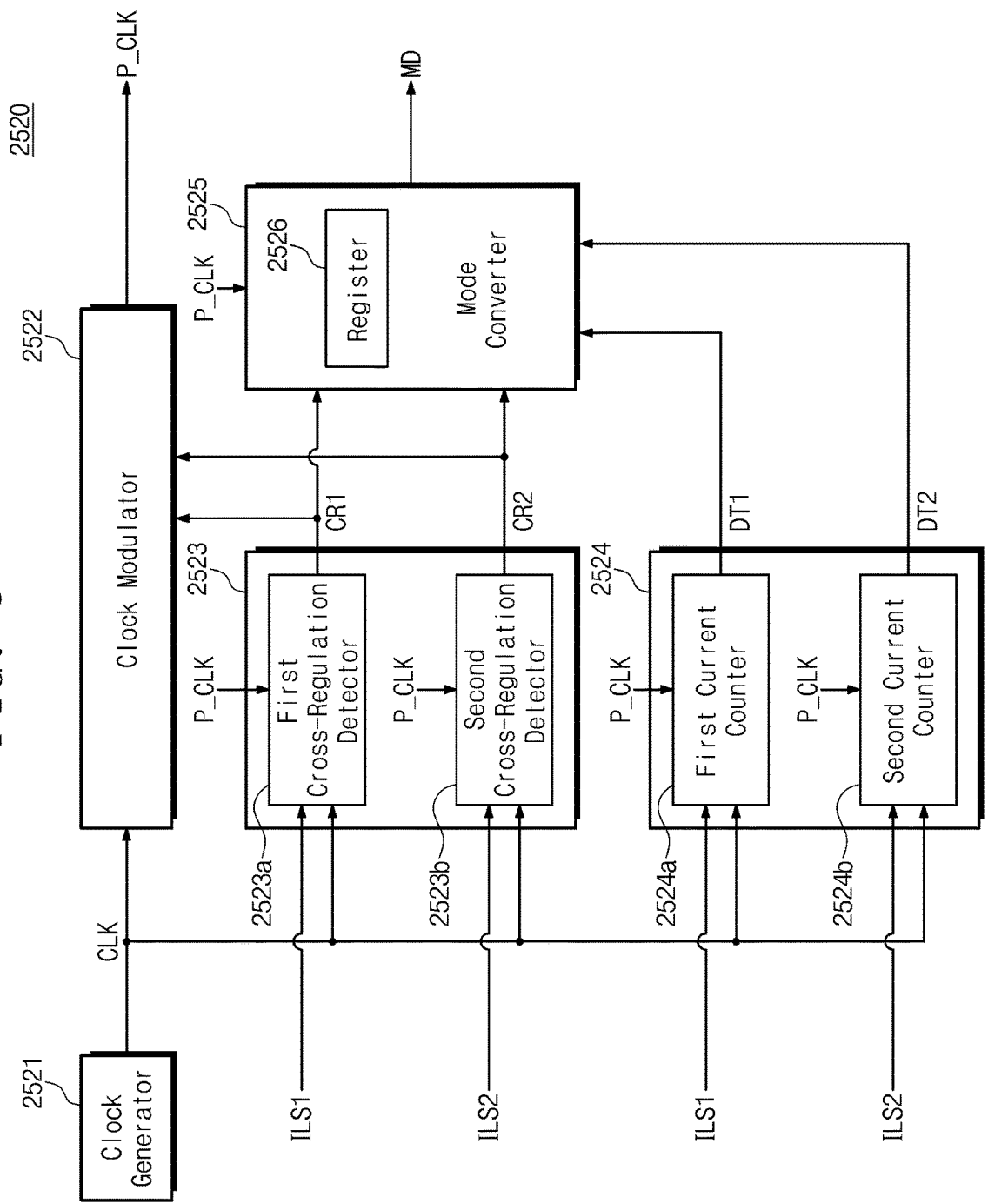
FIG. 5 is a block diagram of a mode control unit according to an embodiment of the inventive concept.

FIG. 5 is a block diagram of a mode control unit according to an embodiment of the inventive concept. The mode control unit 2520 of FIG. 5 will be understood as an embodiment of the mode control unit 252 of FIG. 4. Referring to FIG. 5, the mode control unit 2520 includes a clock generator 2521, a clock modulator 2522, a cross-regulation detector 2523, a current counter 2524, and a mode converter 2525. The clock generator 2521 generates the clock signal CLK. The generated clock signal CLK is provided to the clock modulator 2522, the cross-regulation detector 2523, and the current counter 2524.

The clock modulator 2522 receives the clock signal CLK from the clock generator 2521. The clock modulator 2522 generates the clock modulation signal P_CLK based on the clock signal CLK. The clock modulator 2522 may count the clock signal CLK as long as it is used for driving the DC-DC converter 200. The clock modulator 2522 divides the clock signal CLK of the clock signal CLK to generate the clock modulation signal P_CLK. The clock modulation signal P_CLK may be a reference clock for generating an output voltage. The clock modulation signal P_CLK is provided to the output control unit 253 of FIG. 4.

The clock modulator 2522 receives the first cross-regulation signal CR1 or the second cross-regulation signal CR2 from the cross-regulation detector 2523 to be described later. The clock modulator 2522 may maintain a pulse of the clock modulation signal P_CLK during the time that the first cross-regulation signal CR1 or the second cross-regulation signal CR2 is outputted to the high level. The clock modulator 2522 may maintain the operating state of the DC-DC converter 200 by the time that the pulse of the clock modulation signal P_CLK is maintained. That is, the full discharging time of the first inductor 210 or the second inductor 220 may be secured based on the clock modulation signal P_CLK.

The cross-regulation detector 2523 includes a first cross-regulation detector 2523a and a second cross-regulation detector 2523b. The first cross-regulation detector 2523a may receive the first sensing current ILS1 from the current sensing unit 251. The second cross-regulation detector 2523b may receive the second sensing current ILS2 from the current sensing unit 251. The first cross-regulation detector 2523a and the second cross-regulation detector 2523b may receive the clock signal CLK from the clock generator 2521. The first cross-regulation detector 2523a and the second cross-regulation detector 2523b may receive a clock modulation signal P_CLK from the clock modulator 2522.

The cross-regulation detector 2523 may determine a reference time to provide an output voltage to a specific output terminal using a clock signal CLK or a clock modulation signal P_CLK. If the magnitude of the first sensing current ILS1 is greater than the threshold current at the end of the reference time, the first cross-regulation detector 2523a may output the first cross-regulation signal CR1 at a high level. If the magnitude of the second sensing current ILS2 is greater than the threshold current at the end of the reference time, the second cross-regulation detector 2523a may output the second cross-regulation signal CR2 at a high level. The threshold current is defined as the current when the first inductor 210 or the second inductor 220 is completely discharged. For example, the threshold current may be zero.

In general, the first inductor 210 and the second inductor 220 must be completely discharged at the end of the reference time. If the first inductor 210 and the second inductor 220 are not fully discharged at the end of the reference time, cross-regulation may occur at the output terminal providing the output voltage for the next reference time. Therefore, the cross-regulation detector 2523 supplies the first and second cross-regulation signals CR1 and CR2 to the clock modulator 2522 so that the first inductor 210 and the second inductor 220 secure additional discharging time. The cross-regulation detector 2523 may also provide the first and second cross-regulation signals CR1 and CR2 to the mode converter 2525 for the operation mode conversion of the DC-DC converter 200.

The current counter 2524 includes a first current counter 2524a and a second current counter 2524b. The first current counter 2524a may receive the first sensing current ILS1 from the current sensing unit 251. The second current counter 2524b may receive the second sensing current ILS2 from the current sensing unit 251. The first current counter 2524a and the second current counter 2524b may receive the clock signal CLK from the clock generator 2521. The first current counter 2524a and the second current counter 2524b may receive a clock modulation signal P_CLK from the clock modulator 2522.

The current counter 2524 may determine a reference time to provide an output voltage to a specific output terminal using a clock signal CLK or a clock modulation signal P_CLK. The first current counter 2524a may count the fully discharged time of the first inductor 210 within the reference time. The second current counter 2524b may count the fully discharged time of the second inductor 220 within the reference time. The first current counter 2524a may measure the first full discharging time at which the first sensing current ILS1 is below the threshold current to generate the first discharging time signal DT1. The second current counter 2524b may measure the second full discharging time at which the second sensing current ILS2 is below the threshold current to generate the second discharging time signal DT2.

The mode converter 2525 receives the first cross-regulation signal CR1 and the second cross-regulation signal CR2 from the cross-regulation detector 2523. The mode converter 2525 receives the first discharging time signal DT1 and the second discharging time signal DT2 from the current counter 2524. The mode converter 2525 receives the clock modulation signal P_CLK from the clock modulator 2522. The mode converter 2525 generates the mode signal MD. The mode signal MD includes a serial mode signal and an isolation mode signal. The mode converter 2525 may provide a serial mode signal or an isolation mode signal to the switch control unit 254.

The mode converter 2525 includes a register 2526. The register 2526 may store an operation mode of the current cycle. For example, the register 2526 may store the operation mode at the beginning of the cycle in the clock modulation signal P_CLK. The mode converter 2525 may convert the serial mode signal into an isolation mode signal based on the first and second cross-regulation signals CR1 and CR2. When the first cross-regulation signal CR1 or the second cross-regulation signal CR2 is at a high level, the mode converter 2525 generates the isolation mode signal in order to electrically isolate the first inductor 210 and the second inductor 220.

The mode converter 2525 may convert the isolation mode signal into a serial mode signal based on the first discharging time signal DT1 and the second discharging time signal DT2 and output the serial mode signal. If the first discharging time and the second discharging time are sufficiently long, cross-regulation will not occur even if the first inductor 210 and the second inductor 220 are connected in series. If the first discharging time is greater than the first stabilization time and the second discharging time is greater than the second stabilization time, cross-regulation does not occur even if converted to the serial mode. Thus, the mode converter 2525 generates a serial mode signal. The first stabilization time and the second stabilization time are specifically defined in FIG. 9.

Figure 6:
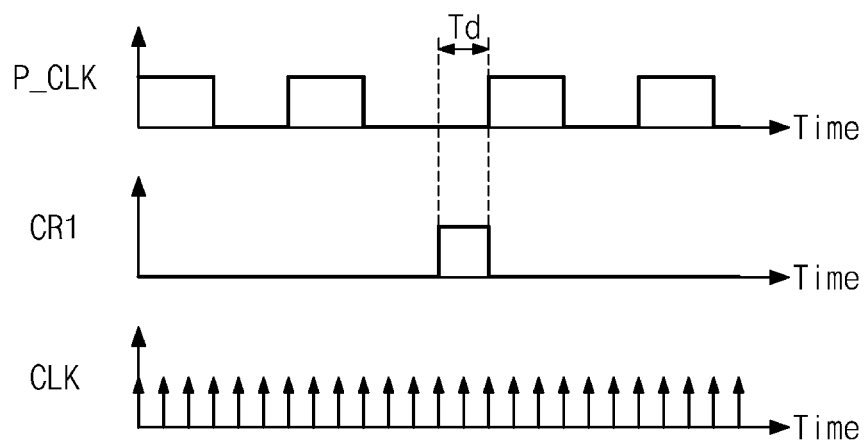
FIG. 6 is a timing diagram for explaining the operation of a pulse modulation signal when converting from a serial mode to an isolation mode.

FIGS. 6 to 9 are timing diagrams of a DC-DC converter according to an embodiment of the inventive concept. FIG. 6 is a timing diagram for explaining the operation of a pulse modulation signal when converting from a serial mode to an isolation mode. The horizontal axis in FIG. 6 represents time. The vertical axis of FIG. 6 represents the magnitude of the clock signal CLK, the first cross-regulation signal CR1 (or the second cross-regulation signal CR2), and the clock modulation signal P_CLK over time.

The clock signal CLK is generated in the clock generator 2521 in FIG. 5. The clock modulation signal P_CLK is generated in the clock modulator 2522 of FIG. 5. The clock modulator 2522 may count the clock signal CLK to generate a clock modulation signal P_CLK. FIG. 6 shows that the level of a clock modulation signal P_CLK is converted during three cycles of a clock signal CLK. However, the inventive concept is not limited to this, and the clock modulation signal P_CLK may be generated by dividing from the clock signal CLK so as to have a clock frequency that is several hundred times lower than the clock signal CLK.

The clock modulation signal P_CLK may be the reference clock of the DC-DC converter. The reference time to provide the output voltage to a particular output terminal may be equal to the cycle of the clock modulation signal P_CLK. During the cycle of the clock modulation signal P_CLK, the first inductor 110 or 210 or the second inductor 120 or 220 may be charged and discharged. If the first inductor 110 or 210 (or the second inductor 120 or 220) is not fully discharged during the clock modulation signal P_CLK, the cross-regulation detector 2523 may change the first cross-regulation signal CR1 (or the second cross-regulation signal CR2) to a high level.

The first cross-regulation signal CR1 is maintained at a high level until the first inductors 110 and 210 are completely discharged. The time at which the first cross-regulation signal CR1 is maintained at a high level is defined as a delay time Td. The maximum value of the delay time Td may be limited. A pulse of the clock modulation signal P_CLK is maintained until the first inductor 110 or 210 is fully discharged. That is, the reference time for the corresponding output terminal is increased for the full discharge of the first inductor 110 or 210. Thereafter, the operation mode of the DC-DC converter is changed, and the cycle of the clock modulation signal P_CLK is maintained normally.

Figure 7:
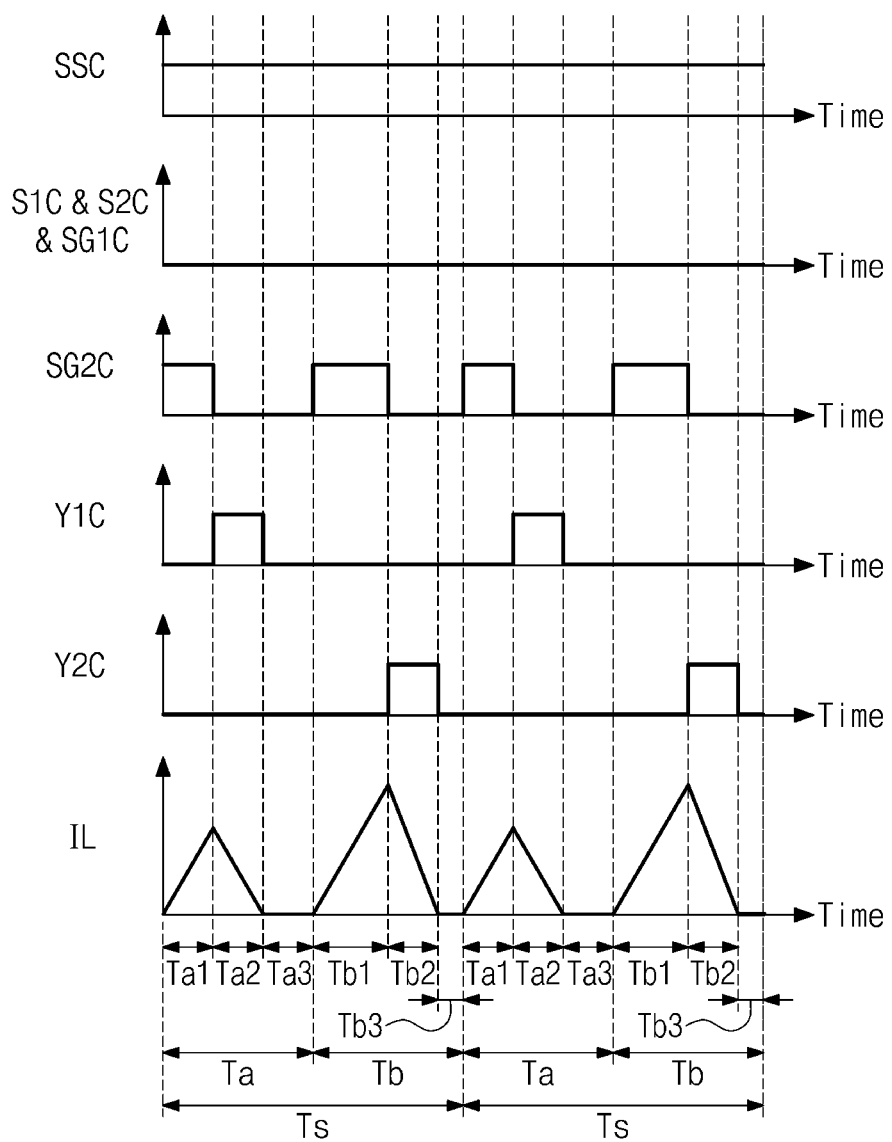
FIG. 7 is a timing diagram for explaining the operation of switches and a current flow in a serial mode.

FIG. 7 is a timing diagram for explaining the operation of the switches of FIG. 3 and the flow of an inductor current in a serial mode. To help understanding of the description, FIG. 7 will be described with reference to FIG. 3. The horizontal axis in FIG. 7 represents time. The vertical axis in FIG. 7 represents the magnitudes of serial mode switch control signals SSC, first and second isolation mode control signals S1C and S2C, first and second ground switch control signals SG1C and SG2C, first and second normal output switch control signals Y1C and Y2C, and an inductor current IL over time.

It is assumed that each of the switch control signals shown in FIG. 7 switches on the switches at a high level and switches off the switches at a low level. However, the inventive concept is not limited to this, and each switch control signal may switch off the switches at a high level and switch on the switches at a low level. In this case, the waveform of the switch control signals in FIG. 7 will be opposite. In the serial mode of FIG. 7, the serial mode switch control signal SSC is maintained at a high level. Also, the first and second isolation mode control signals S1C and S2C and the first ground switch control signal SG1C are maintained at a low level.

It is assumed in FIG. 7 that there are two output terminals. The DC-DC converter provides the output voltage to the first output terminal O1 during the first reference time Ta and provides the output voltage to the second output terminal O2 during the second reference time Tb. The first reference time Ta and the second reference time Tb may be the same. The DC-DC converter according to FIG. 7 may alternately provide an output voltage to the first output terminal O1 and the second output terminal O2. The time for providing the output voltage to the first output terminal O1 and the second output terminal O2 is defined as a multiple output cycle Ts.

The first reference time Ta includes a first charging time Ta1, a first discharging time Ta2, and a first resting time Ta3. The first and second inductors 210 and 220 are charged at the first charging time Ta1. The second ground switch control signal SG2C switches on the second ground switch SG2 such that the first and second inductors 210 and 220 are charged by the input voltage. The first and second inductors 210 and 220 are discharged at the first discharging time Ta2. The first normal output switch control signal Y1C switches on the first normal output switch Y1 so that the energy charged in the first and second inductors 210 and 220 is transferred to the first output terminal O1. The first and second inductors 210 and 220 are completely discharged at the first pause time Ta3. At this time, the magnitude of the inductor current IL may be zero, which is the threshold current.

The second reference time Tb includes a second charging time Tb1, a second discharging time Tb2, and a second pause time Tb3. The first and second inductors 210 and 220 are charged at the second charging time Tb1. The second ground switch control signal SG2C switches on the second ground switch SG2 such that the first and second inductors 210 and 220 are charged by the input voltage. The first and second inductors 210 and 220 are discharged at the second discharging time Tb2. The second normal output switch control signal Y2C switches on the second normal output switch Y2 so that the energy charged in the first and second inductors 210 and 220 is transferred to the second output terminal O2. The first and second inductors 210 and 220 are completely discharged at the second pause time Tb3.

The loads connected to the first output terminal O1 and the second output terminal O2 may be different from each other. When the energy required for the first output terminal O1 and the energy required for the second output terminal O2 are different, the charging time, the discharging time, and the pause time may be different. In addition, the inductor current IL provided in the first reference time Ta and the inductor current IL provided in the second reference time Tb may be different from each other. When the energy required for the second output terminal O2 is greater than the energy required for the first output terminal O1, the sum of the second charging time Tb1 and the second discharging time Tb2 may be longer than the sum of the first charging time Ta1 and the first discharging time Ta2. In addition, the second pause time Tb3 may be shorter than the first pause time Ta3.

Figure 8:
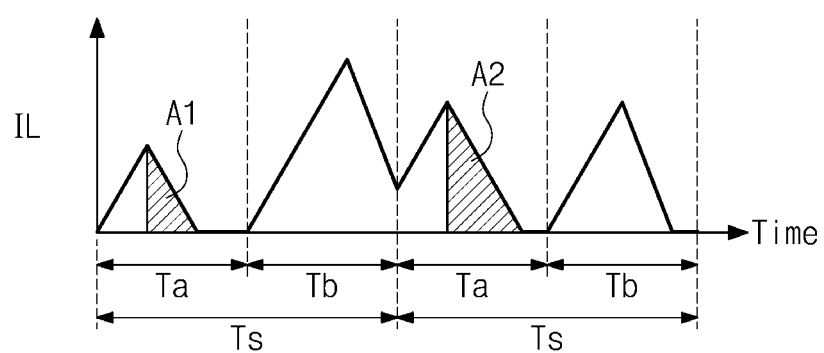
FIG. 8 is a timing diagram for explaining the occurrence of cross-regulation when a serial mode is maintained.

FIG. 8 is a timing diagram for explaining the occurrence of cross-regulation when a serial mode is maintained. To help understanding of the description, FIG. 8 will be described with reference to FIG. 3. The horizontal axis in FIG. 8 represents time. The vertical axis of FIG. 8 represents the magnitude of the inductor current IL over time. The multiple output cycle Ts includes a first reference time Ta and a second reference time Tb. The inductor current IL is supplied to the first output terminal O1 at the first reference time Ta and the inductor current IL is supplied to the second output terminal O2 at the second reference time Tb.

During the first reference time Ta, the DC-DC converter provides energy to the first output terminal O1. The energy provided to the first output terminal O1 during the first reference time Ta depends on the first width A1. The first area A1 is an integral value of the inductor current IL during the time that the first and second inductors 210 and 220 are discharged. As the first width A1 becomes greater, the energy provided to the first output terminal O1 rises.

During the second reference time Tb, the DC-DC converter provides energy to the second output terminal O2. Unlike FIG. 7, when the load connected to the second output terminal O2 is abruptly changed, the energy provided to the second output terminal O2 is changed. For example, when the load connected to the second output terminal O2 is in an overload state, the energy required for the second output terminal O2 may increase. In this case, the charging time and the discharging time of the first and second inductors 210 and 220 increase. When the sum of the charging time and the discharging time of the first and second inductors 210 and 220 is greater than the second reference time Tb, the first and second inductors 210 and 220 are not completely discharged. That is, the inductor current IL does not reach the threshold current 0, and the pause time is not provided at the second reference time Tb.

At the time when the first reference time Ta starts again, the magnitude of the inductor current IL is larger than the threshold current. Therefore, when the first and second inductors 210 and 220 are charged for the same charging time as the first reference time Ta, the energy charged in the first and second inductors 210 and 220 increases. The discharging time required to completely discharge the first and second inductors 210 and 220 is larger than the discharging time at the previous first reference time Ta. That is, the second width A2 is larger than the first width A1. Since an amount of energy greater than that required for the first output terminal O1 is provided to the load, cross-regulation occurs.

Figure 9:
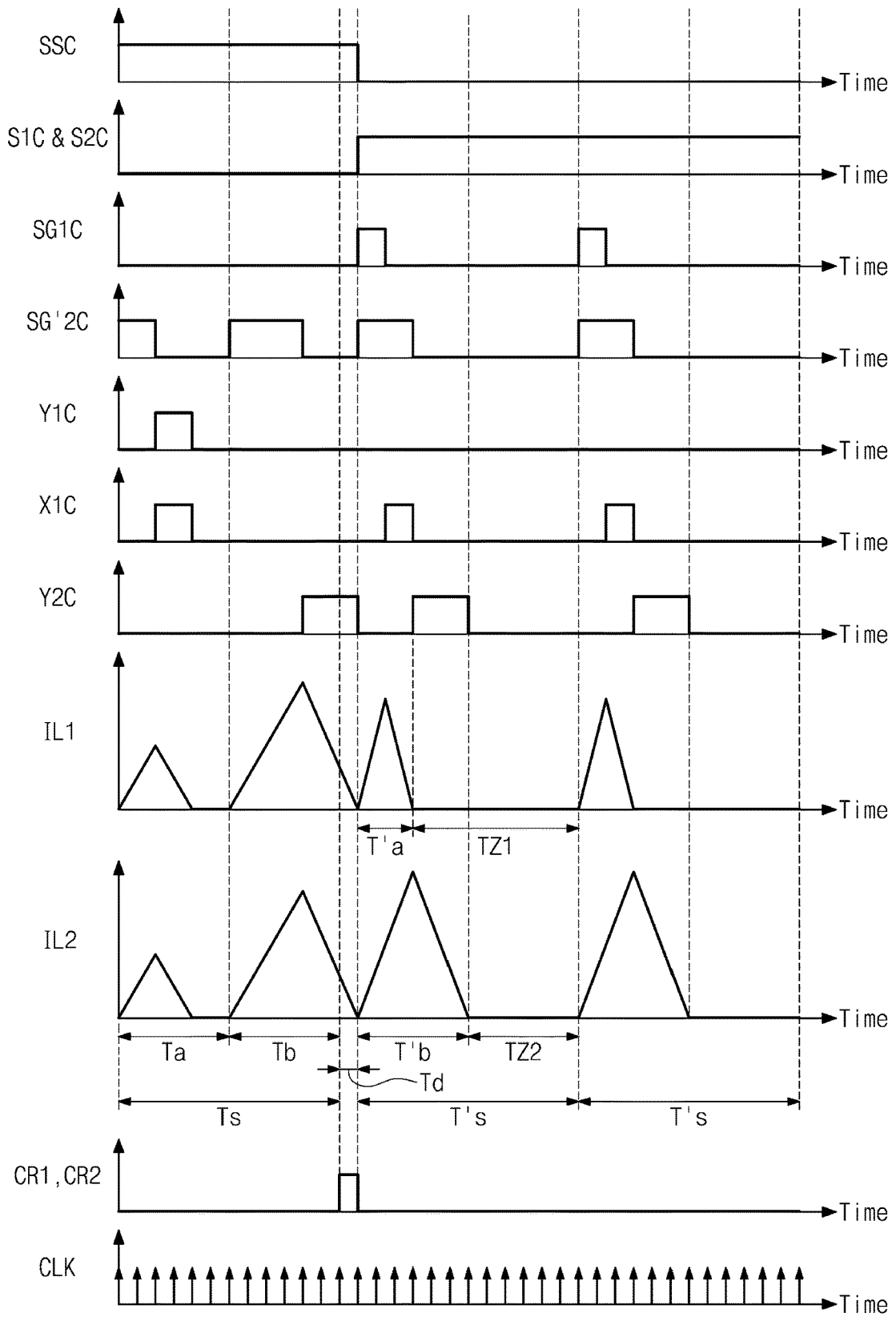
FIG. 9 is a timing diagram for explaining the operation of switches for converting from a serial mode to an isolation mode and the flow of current.

FIG. 9 is a timing diagram for explaining the operation of switches for converting from a serial mode to an isolation mode and the flow of current. To help understanding of the description, FIG. 9 will be described with reference to FIG. 3. The horizontal axis in FIG. 9 represents time. The vertical axis in FIG. 9 represents the magnitudes of serial mode switch control signals SSC, first and second isolation mode control signals S1C and S2C, first and second ground switch control signals SG1C and SG2C, first and second normal output switch control signals Y1C and Y2C, a first split output switch control signal X1C, a first inductor current IL1 and a second inductor current IL2, over time.

It is assumed that each of the switch control signals shown in FIG. 9 controls the switches at the high level to the ON state and controls the switches to the OFF state at the low level. However, the inventive concept is not limited to this, and each switch control signal may switch off the switches at a high level and switch on the switches at a low level. In this case, the waveform of the switch control signals in FIG. 7 will be opposite.

In the serial mode, since the first inductor 210 and the second inductor 220 are connected in series, the first inductor current IL1 and the second inductor current IL2 are the same. During the first reference time Ta, the DC-DC converter provides energy to the first output terminal O1. During the second reference time Tb, the DC-DC converter provides energy to the second output terminal O2. When the first and second inductors 210 and 220 are not completely discharged during the second reference time Tb, at the end of the second reference time Tb, the magnitude of the first inductor current IL1 and the second inductor current IL2 is greater than zero. In this case, the first cross-regulation signal CR1 and the second cross-regulation signal CR2 are changed to the high level.

The first cross-regulation signal CR1 and the second cross-regulation signal CR2 maintain a high level until the first inductor current IL1 and the second inductor current IL2 reach the zero threshold current. The first inductor current IL1 and the second inductor current IL2 reach zero during the delay time Td. During the delay time Td, the magnitudes of a serial mode switch control signal SSC, first and second isolation mode control signals S1C and S2C, first and second ground switch control signals SG1C and SG2C, and first and second normal output switch control signals Y1C and Y2C are maintained.

When the first inductor current IL1 and the second inductor current IL2 reach the zero threshold current or exceed the maximum value of the delay time Td, the first and second cross-regulation signals CR1 and CR2 are changed to a low level. At this time, the operation mode of the DC-DC converter is changed to the isolation mode. The serial mode switch control signal SSC is changed to a low level. The first and second isolation mode control signals S1C and S2C are changed to a high level. Accordingly, the first inductor 210 and the second inductor 220 are electrically isolated. In the isolation mode, the magnitudes of the first inductor current IL1 and the second inductor current IL2 are determined independently of each other.

In the isolation mode, FIG. 9 assumes that the first inductor 210 provides energy to the first output terminal O1 and the second inductor 220 provides energy to the second output terminal O2. When the first inductor 210 and the second inductor 220 have different inductances, the charging speed and the discharging speed may be different from each other. In the case of FIG. 9, the inductance of the first inductor 210 is smaller than the inductance of the second inductor 220. Therefore, the slope of the first inductor current IL1 is larger than the slope of the second inductor current IL2, and the charging speed of the first inductor 210 is faster than the charging speed of the second inductor 220.

The multiple output cycle Ts' of the isolation mode may be equal to the sum of the first charging/discharging time T'a and the first full discharging time TZ1. Alternatively, the multiple output cycle Ts' of the isolation mode may be the same as the multiple output cycle Ts of the serial mode. The multiple output cycle Ts' of the isolation mode may be equal to the sum of the first reference time Ta and the second reference time Tb of the serial mode. The first inductor 210 is charged and discharged at the first charging/discharging time T'a. The first inductor 210 is completely discharged at the first full discharging time TZ1. The second inductor 220 is charged and discharged at the second charging/discharging time T'b. The second inductor 220 is completely discharged at the second full discharging time TZ2.

The first inductor 210 is charged while the first ground switch control signal SG1C switches on the first ground switch SG1. While the first split output switch control signal X1C switches on the first split output switch X1, the first inductor 210 is discharged and transfers energy to the first output terminal O1. The second inductor 220 is charged while the second ground switch control signal SG2C switches on the second ground switch SG2. While the second normal output switch control signal X2C switches on the second normal output switch X2, the second inductor 220 is discharged and transfers energy to the second output terminal O2.

When the serial mode is changed to the isolation mode, the first ground switch control signal SG1C and the second ground switch control signal SG2C may be changed to the high level. That is, the first inductor 210 and the second inductor 220 may be charged at the same time. In the DC isolation mode, the energy provided to the first output terminal O1 and the energy provided to the second output terminal O2 may be simultaneously stored using different inductors. Therefore, compared with the serial mode, fast energy may be provided to the first output terminal O1 and the second output terminal O2 in the isolation mode. In particular, energy may be quickly supplied to the second output terminal O2, which requires a large amount of energy due to overload or the like.

The DC-DC converter may convert the isolation mode to the serial mode again based on the first full discharging time TZ1 and the second full discharging time TZ2. When the first full discharging time TZ1 is greater than the first stabilization time Tst1 and the second full discharging time TZ2 is greater than the second stabilization time Tst2, the operating mode of the DC-DC converter is converted to the serial mode. When there are two output terminals, the first stabilization time Tst1 is defined in Equation 1. The second stabilization time Tst2 is defined in Equation 2.

$$Tst1 = (0.5 \cdot Ts + aa)\left(\frac{L1 + L2}{L1}\right); Tz1 > Tst1 \quad \text{[Equation 1]}$$

$$Tst2 = (0.5 \cdot Ts + aa)\left(\frac{L1 + L2}{L2}\right); Tz2 > Tst2 \quad \text{[Equation 2]}$$

Ts represents a multiple output cycle. L1 represents the inductance of the first inductor 210. L2 represents the inductance of the second inductor 220. aa represents a free time. When there are two output terminals, the DC-DC converter in the serial mode alternately provides energy to two output terminals during a multiple output cycle Ts. Therefore, the first stabilization time Tst1 and the second stabilization time Tst2 are calculated based on 0.5 times of the multiple output cycle Ts. As the sum of L1 and L2 is larger, the first stabilization time Tst1 and the second stabilization time Tst2 are increased. As the sum of L1 and L2 is larger, the charging and discharging time in serial mode increases, so more stabilization time is required to prevent cross-regulation.

Referring to Equation 1, as the inductance L1 of the first inductor is larger, the first stabilization time Tst1 is reduced. As the inductance L2 of the second inductor is larger, the first stabilization time Tst1 increases. When the isolation mode is changed to the serial mode, the charging/discharging speed is slowed due to the series connection of the first inductor 210 and the second inductor 220. When the inductance L1 of the first inductor is larger than the inductance L2 of the second inductor, the change in the first inductor current IL1 due to mode conversion is relatively small. Therefore, as the inductance L1 of the first inductor is larger and the inductance L2 of the second inductor is smaller, the required first stabilization time Tst1 is reduced.

Referring to Equation 2, the second stabilization time Tst2 decreases as the inductance L2 of the second inductor increases for the same reason. In addition, the second stabilization time Tst2 increases as the inductance L1 of the first inductor increases. When the inductance L2 of the second inductor is larger than the inductance L1 of the first inductor, the change in the second inductor current IL2 due to mode conversion is relatively small. It is determined that there is no possibility of cross-regulation when Equation 1 and Equation 2 are satisfied at the same time, and the DC-DC converter converts the isolation mode to the serial mode.

Figure 10:
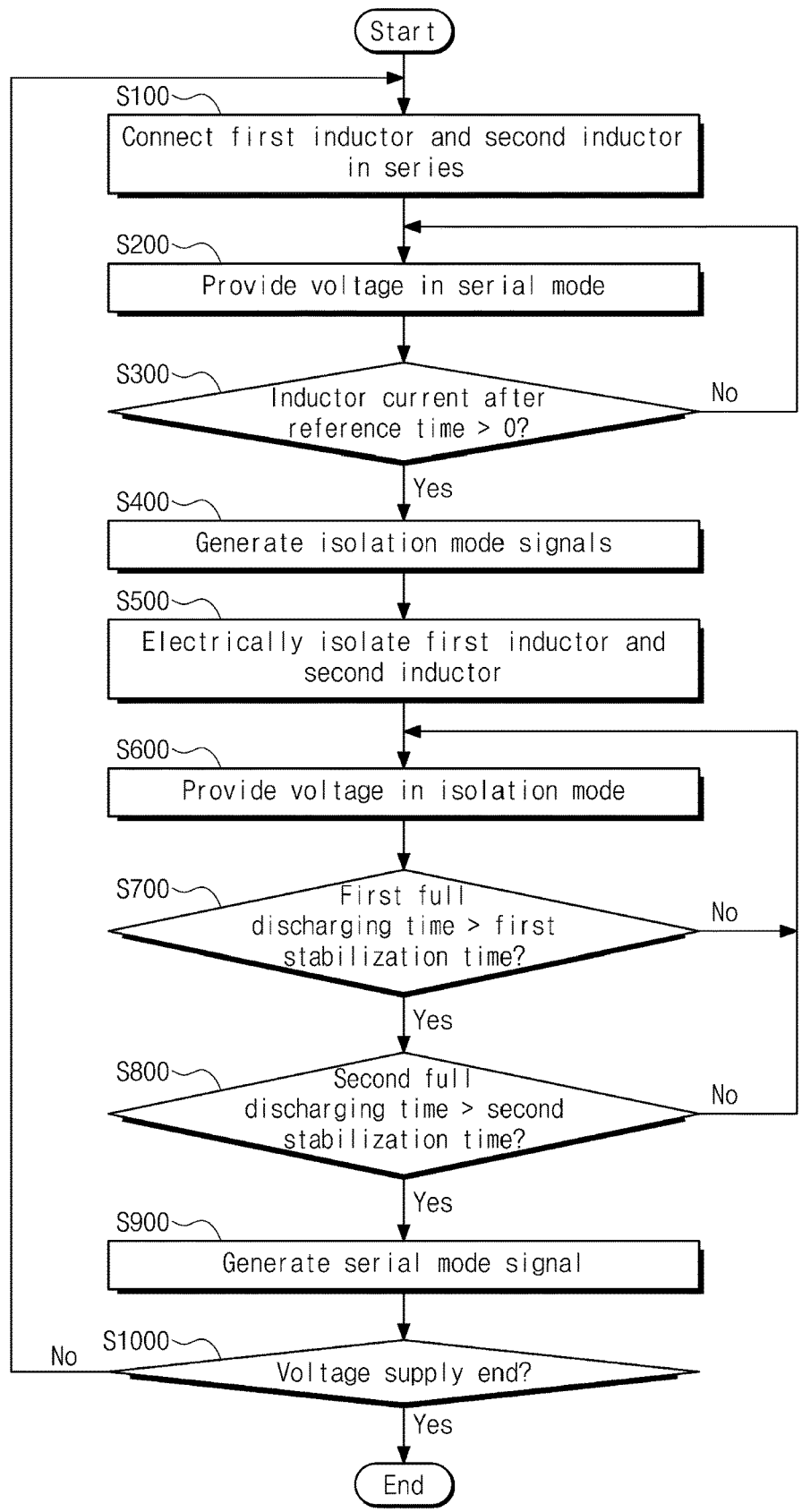
FIG. 10 is a flowchart of a method of driving a DC-DC converter according to an embodiment of the inventive concept.

FIG. 10 is a flowchart of a method of driving a DC-DC converter according to an embodiment of an inventive concept. The driving method of the DC-DC converter is performed in the DC-DC converter 100 of FIG. 2 or the DC-DC converter 200 of FIG. 3. FIG. 10 shows an operation in which cross-regulation occurs while the DC-DC converters 100 and 200 operate in the serial mode and they are converted into the isolation mode and then converted into the serial mode. However, the conversion of this operation mode will be understood as one embodiment, and various operation mode conversions are possible based on the possibility of cross-regulation occurrence. Hereinafter, a method of driving the DC-DC converter in correspondence with the components of FIGS. 3 to 5 will be described.

In operation S100, the first inductor 210 and the second inductor 220 are connected in series. Operation S100 may be performed in the inductor network unit 230. The mode control unit 252 generates the serial mode signal, and the controller 250 controls the serial mode switch SS based on the serial mode signal. The serial mode switch SS connects the first inductor 210 and the second inductor 220 in series. The serial mode switch SS is switched on.

In operation S200, an output voltage is provided to a plurality of output terminals based on the serial mode. Operation S200 may be performed in the output network unit 240. The output network unit 240 provides the corresponding output voltages of the first to nth output voltages VO1 to VOn to the first to nth output terminals O1 to On. Since operation S200 operates in the serial mode, the first to nth output voltages VO1 to VOn are provided based on the inductor current IL flowing through the first inductor 210 and the second inductor 220. The first to nth output voltages VO1 to VOn may alternatively be provided to the first to nth output terminals O1 to On based on the switching operation of the output network unit 240.

In operation S300, the inductor current IL and the threshold current are compared. Operation S300 may be performed in the controller 250. Specifically, operation S300 may be performed in the mode control unit 252. The controller 250 senses the inductor current IL after the reference time from the charging time of the first inductor 210 and the second inductor 220. If the inductor current IL is larger than the threshold current, operation S400 is performed. The threshold current may be a reference current for determining the full discharge of the first inductor 210 and the second inductor 220. For example, the threshold current may be zero. If the inductor current IL is zero, operation S200 is performed to maintain the serial mode.

In operation S400, the controller 250 generates an isolation mode signal. That is, since the possibility of cross-regulation is high, the DC-DC converter 200 operates in an isolation mode. Operation S400 may be performed in the mode converter 2525 of the mode control units 252 and 2520. In operation S500, the first inductor 210 and the second inductor 220 are electrically isolated. Operation S500 may be performed in the inductor network unit 230. The controller 250 controls the serial mode switch SS and the first and second isolation mode switches S1 and S2 based on the isolation mode signal. The serial mode switch SS is switched off.

In operation S600, an output voltage is provided to a plurality of output terminals based on the isolation mode. Operation S600 may be performed in the output network unit 240. The output network unit 240 may provide an output voltage by separating the output terminal and other output terminals that are likely to cause cross-regulation based on a sudden change in load. For example, an output voltage may be provided using the first inductor 210 to an output terminal that generates cross-regulation, and an output voltage may be provided using the second inductor 220 to the remaining output terminals. The level of the output voltage provided to the plurality of output terminals in operation S200 may be equal to the level of the output voltage provided to the plurality of output terminals in operation S600.

In operation S700, the first full discharging time and the first stabilization time are compared. In operation S800, the second full discharging time and the second stabilization time are compared. The first full discharging time may be defined as the full discharging time of the output terminal to which the output voltage is provided by the first inductor 210. The second full discharging time may be defined as the full discharging time of the output terminal to which the output voltage is provided by the second inductor 220. Operations S700 and S800 may be performed in the controller 250. Specifically, operations S700 and S800 may be performed in the current counter 2524 and the mode converter 2525.

If the first full discharging time is greater than the first stabilization time and the second full discharging time is greater than the second stabilization time, cross-regulation does not occur even if converted to the serial mode. Then, operation S900 is performed. If the first full discharging time is less than the first stabilization time and the second full discharging time is less than the second stabilization time, cross-regulation may occur even if converted to the serial mode. Therefore, operation S600 is performed to maintain the isolation mode.

In operation S900, the controller 250 again generates a serial mode signal. That is, the DC-DC converter 200 converts the isolation mode to the serial mode and operates. As shown in operation S1000, if the output voltage is continuously requested, operation S100 is performed. In this case, the first inductor 210 and the second inductor 220 are connected in series with each other.

Figure 11:
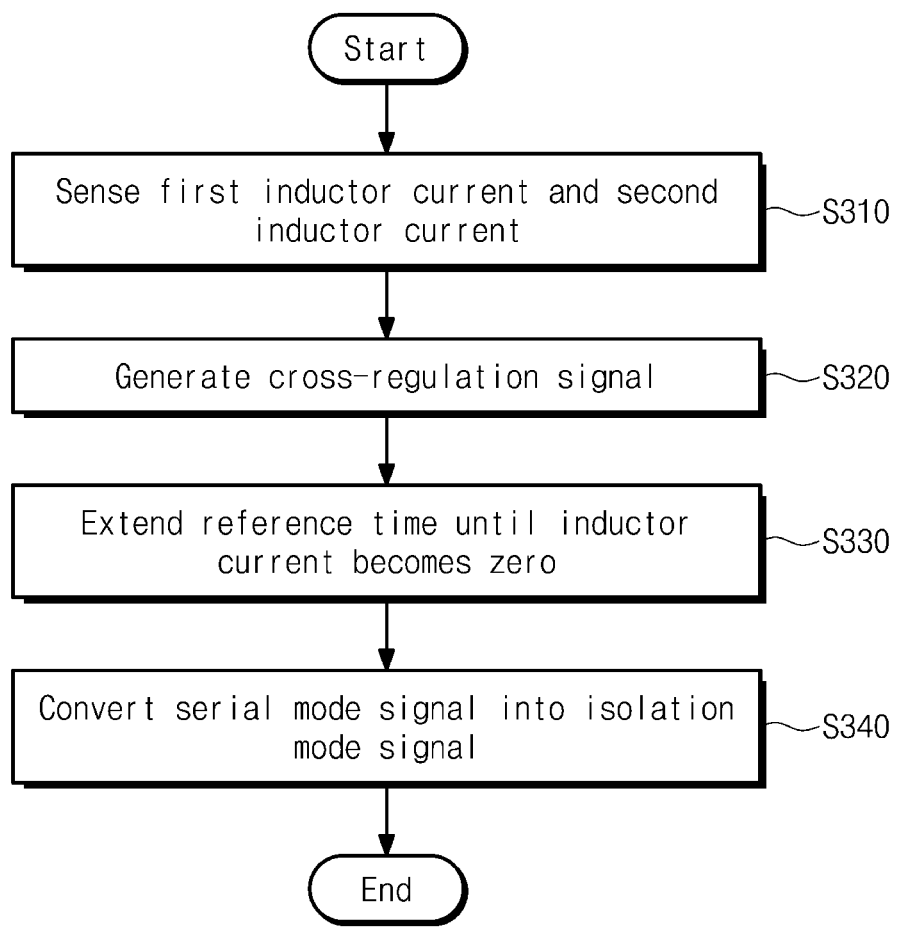
FIG. 11 is a flowchart embodying operation S300 of FIG. 10.

FIG. 11 is a flowchart illustrating operation S300 of comparing an inductor current with a threshold current to determine the possibility of cross-regulation. Operations S300 to S340 may be performed in the controller 250. In operation S310, the controller 250 senses the first inductor current IL1 and the second inductor current IL2. Operation S310 may be performed in the current sensing unit 251. The first inductor current IL1 and the second inductor current IL2 may be the inductor current IL in the serial mode.

In operation S320, the controller 250 generates a cross-regulation signal. The cross-regulation signal includes first and second cross-regulation signals CR1 and CR2. Operation S320 may be performed in the mode control unit 252 or the cross-regulation detector 2523. If the magnitude of the first inductor current IL1 or the second inductor current IL2 is greater than the threshold current after the reference time, the cross-regulation signal may be changed to a high level.

In operation S330, the controller 250 extends the reference time until the inductor current IL becomes the threshold current. Operation S330 may be performed in the mode control unit 252 or the clock modulator 2522. The controller 250 extends the reference time until the first inductor 210 and the second inductor 220 are completely discharged. For example, the controller 250 may maintain the switch operation of the inductor network unit 230 and the output network unit 240 until the inductor current IL becomes zero. As a result, the DC-DC converter may accurately provide the output voltage to the next output terminal. In operation S340, the controller 250 converts the serial mode signal into an isolation mode signal. Operation S340 may be performed in the mode control unit 252 or the mode converter 2525. In operation S340, the DC-DC converter operates in an isolation mode.

The DC-DC converter and the driving method thereof according to the embodiment of the inventive concept may adaptively control the operation mode to reduce the occurrence of cross-regulation. Further, the DC-DC converter and the driving method thereof according to the embodiment of the inventive concept may reduce the ripple current or improve the charging speed depending on the operation mode.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A DC-DC converter comprising:
a first inductor configured to output a first inductor current based on an input voltage;
a second inductor configured to output a second inductor current based on the input voltage;
an output network unit configured to provide a first output voltage to a first output terminal and provide a second output voltage to a second output terminal, based on the first inductor current and/or the second inductor current;
a controller configured to determine cross-regulation with respect to the first output terminal and the second output terminal and generate a mode signal based on the determination; and
an inductor network unit configured to:
electrically connect the first inductor and the second inductor in series between an input terminal and the output network based on the mode signal corresponding to a first mode, and
electrically connect the first inductor between the input terminal and the output network unit and electrically connect the second inductor between the input terminal and the output network unit in parallel with the first inductor based on the mode signal corresponding to a second mode.

2. The DC-DC converter of claim 1, wherein the inductor network unit comprises a serial mode switch that includes one terminal connected to the first inductor and the other terminal connected to the second inductor and is switched off by the controller when the first inductor current or the second inductor current is greater than a threshold current after a reference time from a charging time point of the first inductor and the second inductor.

3. The DC-DC converter of claim 2, wherein the inductor network unit further comprises:
a first isolation mode switch including one terminal connected to the first inductor and the other terminal connected to the output network unit; and
a second isolation mode switch including one terminal receiving the input voltage and the other terminal connected to the second inductor,
wherein the first isolation mode switch and the second isolation mode switch are switched on by the controller when the first inductor current or the second inductor current is greater than the threshold current after the reference time from the charging time point.

4. The DC-DC converter of claim 3, wherein the output network unit comprises:
a first normal output switch including one terminal connected to the second inductor and the other terminal connected to the first output terminal;
a first split output switch including one terminal connected to the first isolation mode switch and the other terminal connected to the first output terminal;
a second normal output switch including one terminal connected to the second inductor and the other terminal connected to the second output terminal; and
a second split output switch including one terminal connected to the first isolation mode switch and the other terminal coupled to the second output terminal.

5. The DC-DC converter of claim 1, wherein the controller comprises:
a mode control unit configured to sense the first inductor current and the second inductor current to generate the mode signal and a clock modulation signal; and
a switch control unit configured to control the output network unit and the inductor network unit based on the mode signal and the clock modulation signal.

6. The DC-DC converter of claim 5, wherein the mode control unit comprises:
a cross-regulation detector configured to output a cross-regulation signal when the first inductor current or the second inductor current is greater than a threshold current after a reference time from a charging time point;
a clock modulator configured to increase a pulse width of the clock modulation signal based on the cross-regulation signal; and
a mode converter configured to generate a mode signal based on the cross-regulation signal.

7. The DC-DC converter of claim 6, wherein the mode signal comprises an isolation mode signal,
wherein the mode converter generates the isolation mode signal when receiving the cross-regulation signal,
wherein the switch control unit electrically isolates the first inductor and the second inductor based on the isolation mode signal.

8. The DC-DC converter of claim 6, wherein the mode control unit comprises:
a first current counter configured to generate a first discharging time signal by measuring a first full discharging time at which the first inductor current is below the threshold current; and
a second current counter configured to generate a second discharging time signal by measuring a second full discharging time at which the second inductor current is below the threshold current.

9. The DC-DC converter of claim 8, wherein the mode signal comprises a serial mode signal,
wherein the mode converter receives the first discharging time signal and the second discharging time signal, and generates a serial mode signal when the first full discharging time is greater than a first stabilization time and the second full discharging time is greater than a second stabilization time,
wherein the switch control unit electrically connects the first inductor and the second inductor based on the serial mode signal.

10. The DC-DC converter of claim 5, wherein the controller further comprises an output control unit configured to compare the first output voltage with a first reference voltage to provide a first output control signal to the switch control unit and compare the second output voltage with a second reference voltage to provide a second output control signal to the switch control unit.

11. A DC-DC converter driving method comprising:
connecting, by an inductor network unit, a first inductor and a second inductor in series between an input terminal and an output network unit based on a serial mode signal;
providing, by the output network unit, a first output voltage to a first output terminal and a second output voltage to a second output terminal, based on an inductor current flowing through the first inductor and the second inductor;
generating, by a controller, an isolation mode signal when the inductor current is greater than a threshold current after a reference time from the charging time point of the first inductor and the second inductor;
electrically disconnecting, by the inductor network unit, the first inductor and the second inductor based on the isolation mode signal; and providing, by the output network unit, a third output voltage to the first output terminal based on a first inductor current flowing in the first inductor and a fourth output voltage to the second output terminal based on a second inductor current flowing in the second inductor.

12. The method of claim 11, wherein the providing of the first and second output voltages comprises:

providing the first output voltage for a first reference time; and providing the second output voltage for a second reference time after the first output time.

13. The method of claim 11, wherein the generating of the isolation mode signal comprises extending the reference time until the inductor current has the same value as the threshold current.

14. The method of claim 11, wherein the generating of the isolation mode signal comprises:

sensing the inductor current by the controller;

generating a high-level cross-regulation signal when the inductor current is greater than the threshold current; and converting the serial mode signal into the isolation mode signal based on the cross-regulation signal.

15. The method of claim 11, wherein the providing of the third and fourth output voltages comprises simultaneously charging the first inductor and the second inductor based on the isolation mode signal.

16. The method of claim 11, wherein a voltage level of the first output voltage and a voltage level of the third output voltage are the same, and a voltage level of the second output voltage and a voltage level of the fourth output voltage are the same.

17. The method of claim 11, further comprising:

measuring, by the controller, a first full discharging time at which the first inductor current is below the threshold current and a second full discharging time at which the second inductor current is below the threshold current;

generating, by the controller, the serial mode signal when the first full discharging time is greater than a first stabilization time and the second full discharging time is greater than a second stabilization time; and connecting, by the inductor network unit, the isolated first and second inductors in series based on the serial mode signal.

18. The method of claim 17, wherein a magnitude of the threshold current is zero and the first stabilization time and the second stabilization time are dependent on the reference time and an inductance of the first and second inductors.

* * * * *